United States Patent [19]

Abe et al.

[11] Patent Number: 4,975,846
[45] Date of Patent: Dec. 4, 1990

[54] DIAGNOSIS SYSTEM FOR A MOTOR VEHICLE

[75] Inventors: Kunihiro Abe; Tomoya Kobayashi, both of Tokyo, Japan

[73] Assignee: Fuji Jukogyo Kabushiki Kaisha, Tokyo, Japan

[21] Appl. No.: 455,683

[22] Filed: Dec. 22, 1989

Related U.S. Application Data

[63] Continuation of Ser. No. 246,996, Sep. 19, 1988, abandoned.

[30] Foreign Application Priority Data

Oct. 9, 1987 [JP] Japan .................. 62-255909
Oct. 9, 1987 [JP] Japan .................. 62-255910
Nov. 24, 1987 [JP] Japan .................. 62-295538

[51] Int. Cl.$^5$ .................. G01M 15/00; G06F 15/20
[52] U.S. Cl. .................. 364/424.03; 364/551.01; 73/116; 73/118.1; 371/6.4
[58] Field of Search .................. 364/431.03, 431.12, 364/424.03, 424.04, 551.01, 570; 73/116, 118.1; 340/52 R, 52 F, 534; 371/15, 20; 324/73 R, 73 AT

[56] References Cited

U.S. PATENT DOCUMENTS

| | | | |
|---|---|---|---|
| 4,108,358 | 8/1978 | Niemaszyk et al. | 371/210 |
| 4,159,531 | 6/1979 | McGrath | 364/424.04 |
| 4,234,921 | 11/1980 | Kinoshita et al. | 364/431.01 |
| 4,404,639 | 9/1983 | McGuire et al. | 364/424.04 |
| 4,567,756 | 2/1986 | Colborn | 73/118.1 |
| 4,694,408 | 9/1987 | Zaleski | 73/116 |
| 4,748,843 | 6/1988 | Schäfer et al. | 73/117.3 |

FOREIGN PATENT DOCUMENTS 58-12848 1/1983 Japan .

Primary Examiner—Parshotam S. Lall
Assistant Examiner—V. Trans
Attorney, Agent, or Firm—Martin A. Farber

[57] ABSTRACT

An electronic control system for controlling an automotive engine is mounted on a motor vehicle. A memory in a computer stores a plurality of programs for diagnosing the electronic control system, and identification code representing a communication system which is available to receive data signals from the electronic control system. A plurality of communication systems are provided in the computer. The identification code stored in the memory of the electronic control system is read out. In response to the read out identification code, a communication system corresponding to the code is selected. The system is arranged to diagnose the engine based on data received by the selected communication system.

6 Claims, 5 Drawing Sheets

DIAGNOSIS SYSTEM FOR A MOTOR VEHICLE

BACKGROUND OF THE INVENTION

The present invention relates to a diagnosis system for a motor vehicle.

Recently, a motor vehicle has been equipped with an electronic control system for controlling various components of an engine, such as fuel injectors, thereby improving driveability, exhaust gas emission, fuel consumption, and engine power. The electronic control system controls the components based on information represented by output signals from various sensors for detecting engine operating conditions. Accordingly, if malfunctions of components and sensors occur, the engine does not properly operate.

However, because of the complexity of the electronic control system, it is difficult to immediately find out the trouble. Accordingly, a trouble diagnosis device for easily checking the electronic control system should be equipment in an auto shop.

Japanese patent application Laid-Open No. 58-12848 discloses a diagnosis system in which an exclusive checking device is provided for measuring a pulse duration of fuel injection and an engine speed, and for checking whether idling speed is normal. The checking device is provided for diagnosing only designated specific types of motor vehicle.

However, programs and communication systems of the electronic control systems differ with types of electronic control systems. For example, there are various communication systems such as the start-stop system, clock synchronization and others. Further, the signaling speed also differ in types of communication systems.

In order to diagnose various vehicles, it is necessary to equip several types of checking devices corresponding to respective types of electronic control systems, which is inconvenient in management and is uneconomical.

Further, a diagnosis system which stores a plurality of programs and communication systems for diagnosing various types of electronic control systems has been proposed. In such a system, a code representing a type of an electronic control system equipped in a vehicle to be diagnosed must be inputted in the diagnosis system for selecting the program and the communication system. However, it is troublesome work to confirm the corresponding code and to input the code consisting of a plurality of figures. If a mis-code is input, a correct program and communication system are not selected, so that a proper diagnosis can not be performed.

SUMMARY OF THE INVENTION

An object of the present invention is to provide a diagnosis system which has excellent operability with a low cost.

Another object is to provide a system whereby diagnosis may be easily performed without inputting a code for a program and communication system by a diagnostician.

According to the present invention, there is provided a system for diagnosing an automotive engine controlled by an electronic control system, comprising a computer having a central processing unit and a memory, the memory having a plurality of programs for diagnosing including an identification code representing a communication system which is available to receive data signals from the electronic control system, connecting means connecting the computer to the electronic control system, a plurality of communication systems provided in the computer, first means for reading the identification code, select means responsive to a signal of the read out identification code for selecting a communication system from the communication systems in the computer, second means for receiving data from the electronic control system by the selected communication system, and display means for displaying received data in a form of diagnosis data.

In an aspect of the invention, the diagnosis programs and the identification code are stored in a memory detachably attached to the computer.

The other objects and features of this invention will become understood from the following description with reference to the accompanying drawings.

DETAILED DESCRIPTION OF THE PREFERRED EMBODIMENT

Figure 1:
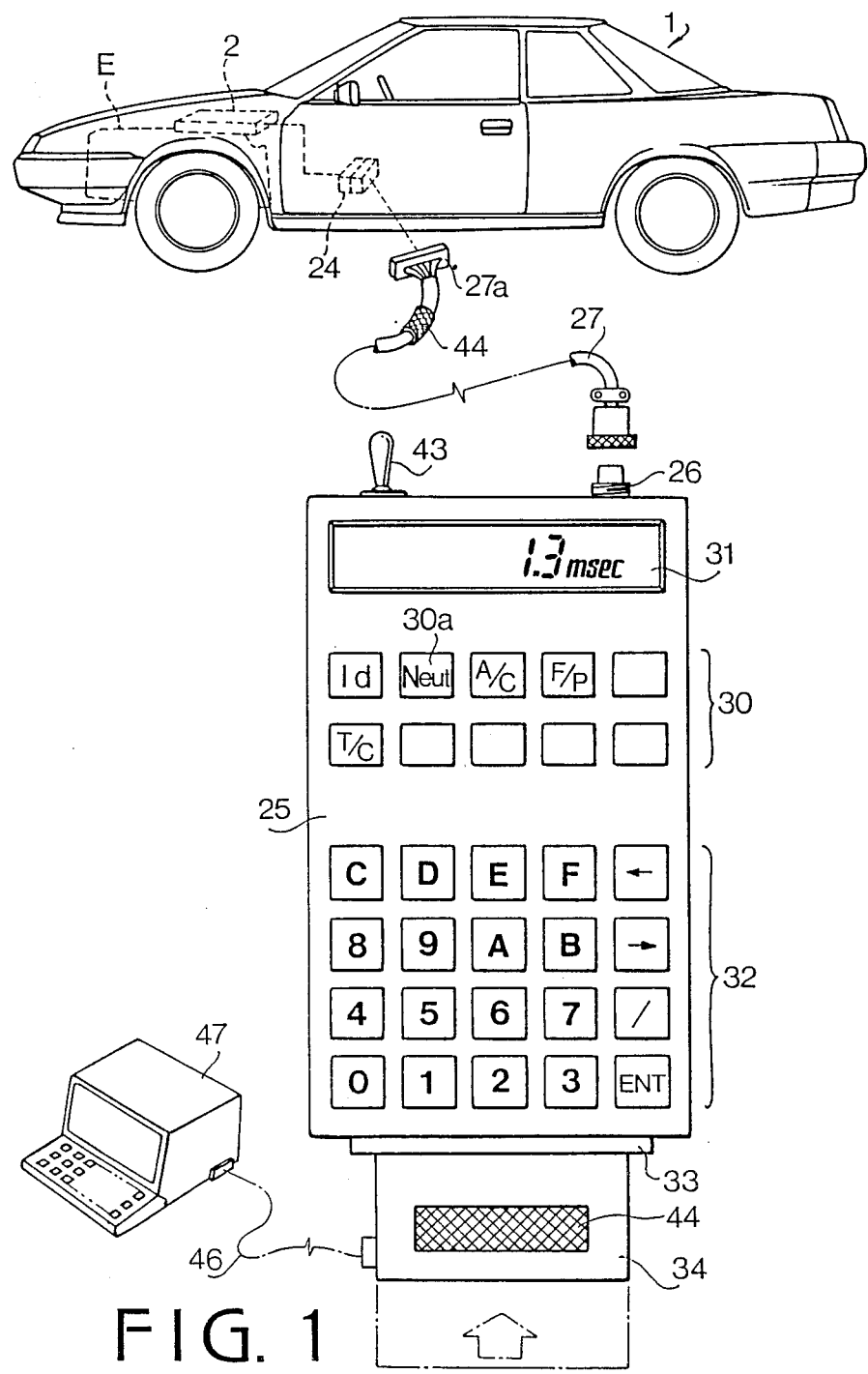
FIG. 1 is a schematic illustration of a diagnosis system according to the present invention.

Referring to FIG. 1, an automobile 1 is equipped with an electronic control system 2 for controlling various components of an engine E. The electronic control system 2 is connected to an external connector 24. A portable diagnosis device 25 comprising a microcomputer has a connector 26, to which the connector 24 of the system 2 is connected through an adapter harness 27. The connector 24 is made into a particular form of the type of the control system 2. In other words, the connector 24 is different with types of the system 2. For the connector 24, the harness 27 having a connector 27a corresponding to the connector 24 is provided for the connector 24. Namely, a plurality of harnesses 27 are provided according to types of the connectors 24. Each harness 27 is identified by a label 44.

The diagnosis device 25 has a power switch 43, a liquid crystal display 31, an indicator section 30 consisting of a plurality of indicators of LED, and a keyboard 32. A connector 33 is provided for connecting a detachable memory cartridge 34.

Figure 2A:
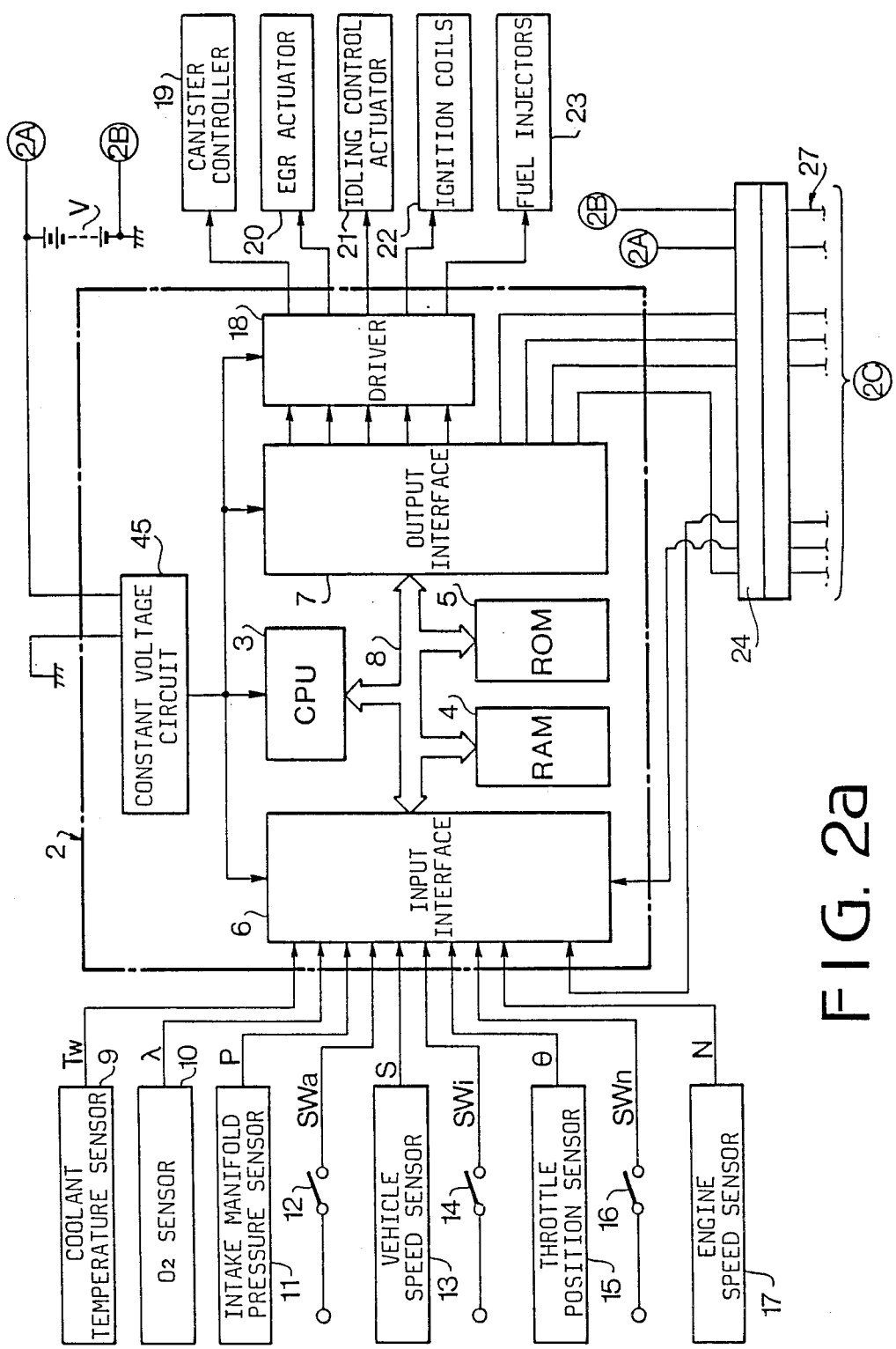
FIGS. 2a, and 2b show a block diagram of the system.
Figure 2B:
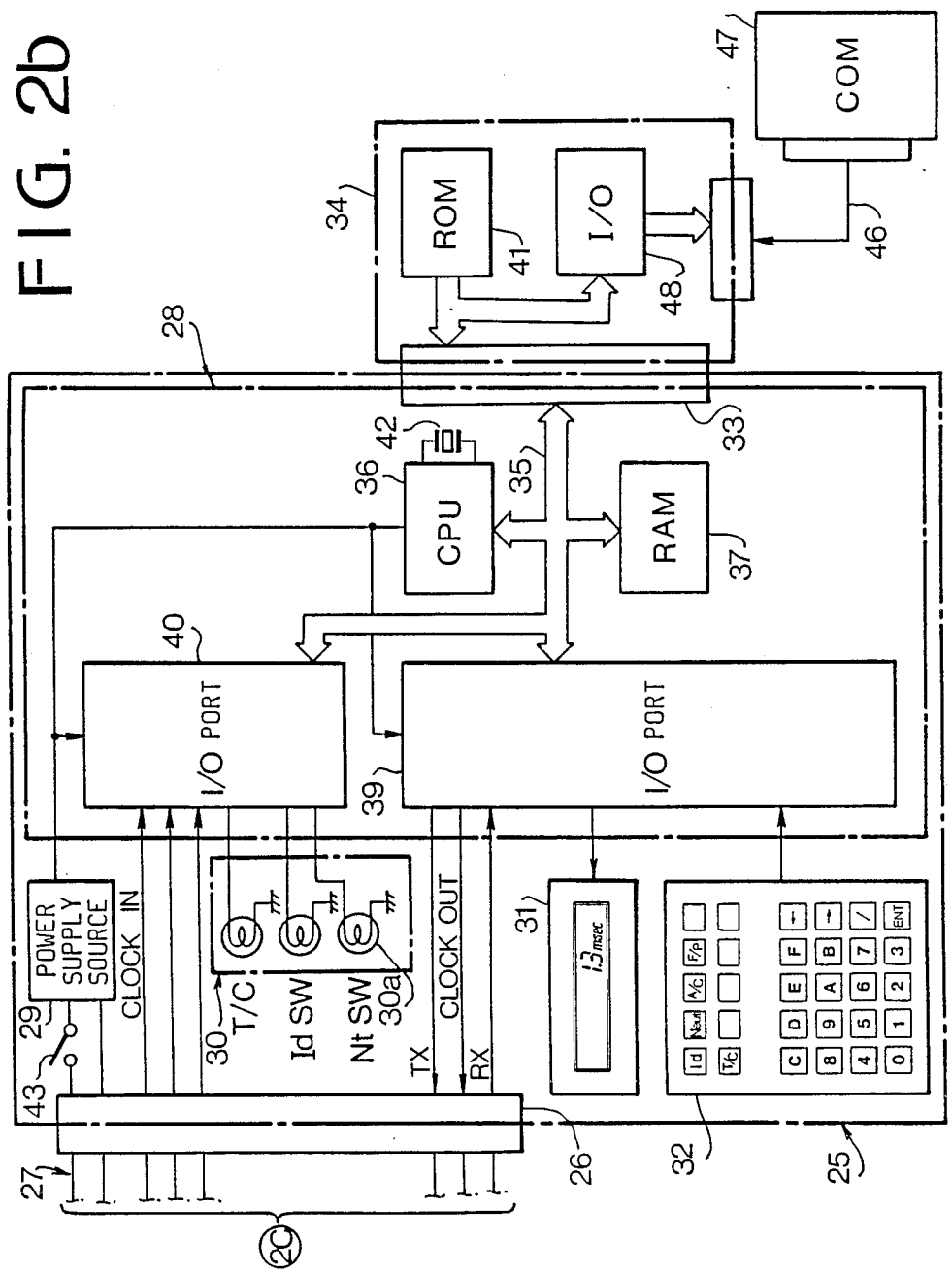

Referring to FIGS. 2a and 2b, the electronic control system 2 comprises a central processor unit (CPU) 3, a random access memory (RAM) 4, a read only memory ROM) 5, an input interface 6 and an output interface 7. The CPU 3, RAM 4, ROM 5, and input and output interfaces 6 and 7 are connected each other through a bus line 8. Programs and data for controlling the engine are stored in the ROM 5. Power is supplied to the CPU 3, input and output interfaces 6 and 7, and driver 18 from a source V through a constant voltage circuit 45.

The input interface 6 is applied with a coolant temperature signal Tw from a coolant temperature sensor 9, an air-fuel ratio feedback signal λ from an O$_2$ sensor 10, an intake-air pressure signal P from an intake manifold pressure sensor 11, an air conditioner operating signal SWa from an air conditioner switch 12, a vehicle speed signal S from a vehicle speed sensor 13, an idling signal SWi from an idle switch 14, a throttle valve opening degree signal θ from a throttle position sensor 15, a neutral positioning signal SWn from a neutral switch 16 in a transmission, and an engine speed signal N from an engine speed sensor 17. These signals are stored in the RAM 4 after data processing in accordance with the program stored in the ROM 5. The CPU 3 produces respective control signals, which are applied to the driver 18 through the output interface 7. The driver 18 produces signals for controlling a canister controller 19 of a fuel-vapor emission control system, an EGR (exhaust gas recirculation system) actuator 20, an idling control actuator 21, ignition coils 22, and fuel injectors 23.

The diagnosis device 25 has a control unit 28 and a power supply source 29. The control unit 28 comprises a CPU 36, a RAM 37, and input/output (I/O) ports 39 and 40. These elements are connected to each other through a bus line 35. A clock pulse generator 42 is provided for generating synchronizing pulses. A ROM 41 provided in the memory cartridge 34 is connected to the bus line 35 through the connector 33. The ROM 41 stores a plurality of programs for diagnosing various troubles of the control system 2. Accordingly, the cartridge 34 is also identified by the same label 44 as the harness 27. The label 44 is colored or bears a code number or mark, for discriminating thereof. Inputs of the I/O port 40 are connected to the output interface 7 of the control system 2 through connectors 24 and 26 and harness 27 so as to receive output signals of sensors and switches 9 to 17. Outputs of the port 40 are connected to the indicator section 30. Inputs of the I/O port 39 are connected to the keyboard 32 for applying a mode select signal dependent on the operation of the keyboard, and to the output interface 7. Outputs of the port 39 are connected to the input interface 6 and the display 31. The power source 29 for supplying the power to the CPU 36 and I/O ports 39 and 40 is connected to the source V through the power switch 43.

The cartridge 34 has an interface 48 for connecting an outside computer 47 through a cable 46, for communication between the electronic control system 2 and the computer 47.

Figure 3:
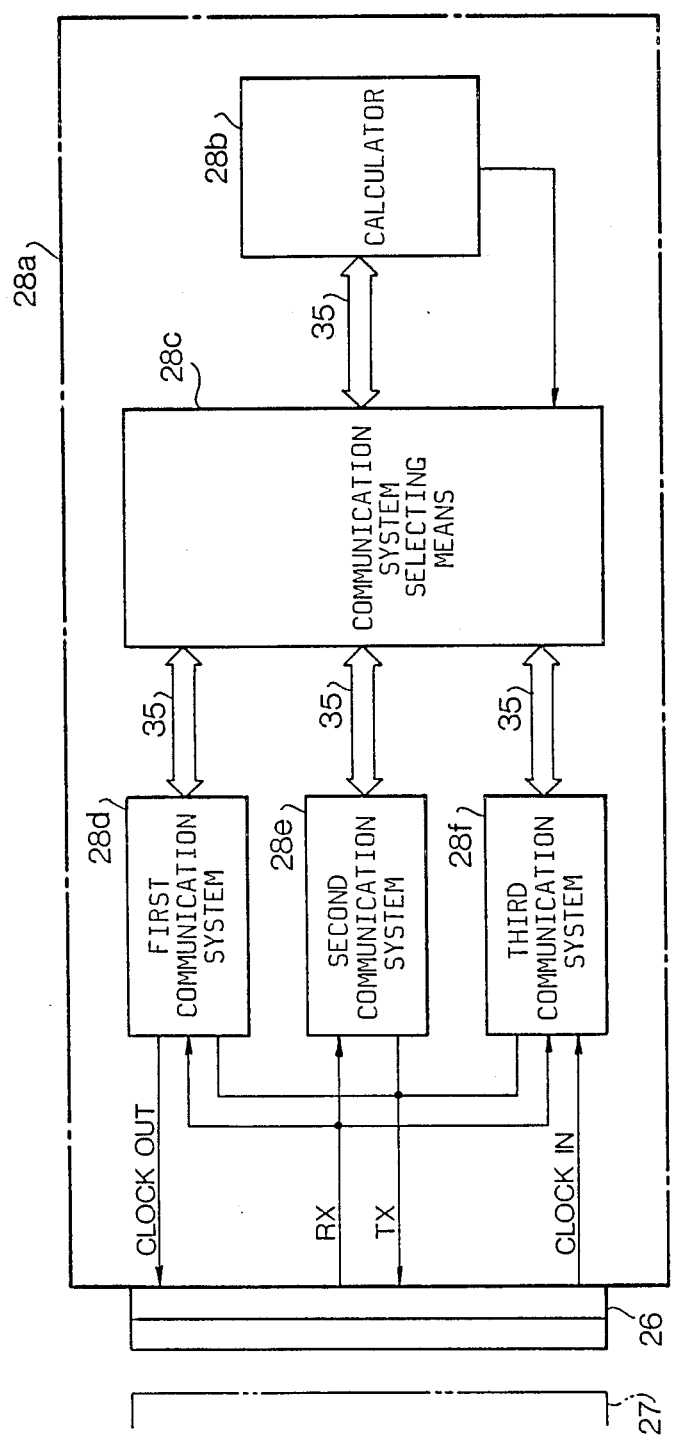
FIG. 3 is a block diagram showing a main part of the system.

Referring to FIG. 3, a communication system selecting section 28a is provided in the control unit 28. The section 28a has a calculator 28b, communication system selecting means 28c, and first, second and third communication systems 28d, 28e and 28f which are connected by bus line 35.

The first communication system 28d is provided for the control system 2 which may be synchronized with outside clock pulses. When the first communication system is selected, the control unit 28 applies clock pulses from the clock pulse generator 42 to the control system 2, thereby receiving data signals from the system 2, synchronizing with the pulses.

The second communication system 28e is provided for receiving data signals by the start-stop system.

The third communication system 28f is provided for the control system 2 having a clock pulse generator, for receiving data signals in synchronism with clock pulses in the control system.

The calculator 28b reads an identification code stored in the ROM 41 and produces a system selection signal which is applied to the communication system selecting means 28c. In response to the system selection signal, the system selecting means 28c selects one of the communication systems 28d to 28f.

Before performing the diagnosis program, the identification code of the electronic control system 2 is confirmed and the corresponding harness 27 and cartridge 34 are selected. The control system 2 is connected to the diagnosis device 25 through the selected harness 27 and the cartridge 34 is attached to the diagnosis device 25.

Figure 4:
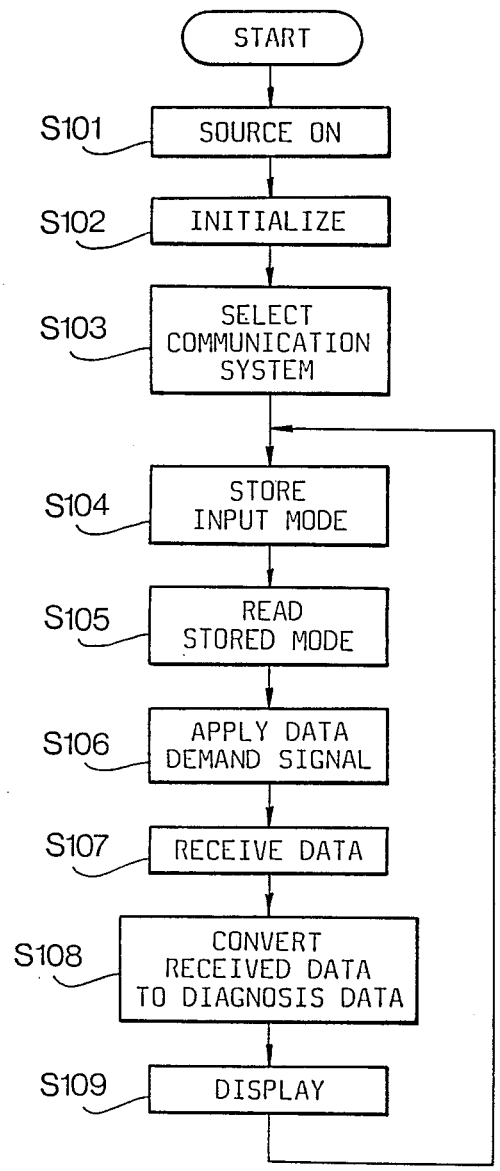
FIG. 4 is a flowchart showing an operation of the system.

The operation of the system is described hereinafter with reference to the flowchart of FIG. 4. The engine is started, and the following diagnosis program is performed under the condition of running of the engine.

The power switch 43 is turned on at a step S101. At a step S102, initialization of the control unit 28 is performed. At a step S103, the calculator 28b reads the identification code stored in the ROM 41 and produces the system selection signal which is applied to the system selecting means 28c, so that one of the communication systems 28d, 28e and 28f is selected. Thus, the communication system corresponding to the control system 2 operates to transmit signals in bidirectional communication.

At a step S104, a diagnostician operates the keyboard 32 to perform the diagnosis of the engine. For example, when the injection pulse width is confirmed, a mode code or mark for the pulse width (for example F→1→2→ENT) is inputted by operating the keyboard 32, and the mode code is stored in the RAM 37.

At a step S105, the stored mode is read by the control unit 28. At a step S106, a corresponding data demand signal TX is applied to the system 2. At a step S107, a data signal RX representing a fuel injection pulse width is applied to the unit 28 from the control system 2 through the selected communication system. At a step S108, the received binary digit is converted into decimal digit representing the pulse width. At a step S109, a pulse width, for example, 1.3 msec is displayed on the display 31. Thus, the diagnostician can diagnose the item about the fuel injection pulse width.

In order to perform other diagnosis items, the keyboard operation is performed and operations after step S104 are repeated.

When the detailed diagnosis is necessary, the computer 47 is connected to the cartridge 34 through the cable 46. By operating the computer 47, a data demand signal TX is fed to the control system 2. Thus, a data signal is applied to the computer 47 from the system, so that the data is displayed in detail. For example, waveforms of input and output signals in the system 2 can be displayed on the display of the computer 47.

Since the output signals of the sensors and switches are applied to the indicator section 30 of diagnosis device 25 through the harness 27, corresponding indicators of the section 30 are turned on or off. For example, if the shift lever of a transmission of the motor vehicle is shifted to the neutral position, a neutral indicator 30a is turned on. If the shift lever is at a position other than the neutral position, the neutral indicator is turned off. Accordingly, if the indicator 30a is turned on when the shift lever is at another position, it is determined that the neutral switch 16 is out of order.

From the foregoing it will be understood that the diagnosis of the engine can be performed without inputting an identification code signal for a communication system, so that the diagnosis can be easily performed without fail.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for diagnosing an automotive engine mounted on a motor vehicle and controlled by an electronic control system, comprising:

a diagnosis device including a computer having a central processing unit, a plurality of communication systems capable of operating with different signal formats and being operatively connected to said computer, and a memory, said memory storing a plurality of programs for diagnosing said engine through said electronic control system, said memory further storing an identification code representing one of said communication systems which is available to receive data signals from said electronic control system;

connecting means for connecting said computer to said one electronic control system;

first means provided in said computer for reading the identification code and for producing an identification code signal;

select means responsive to said identification code signal for selecting said one communication system from said plurality of communication systems;

second means for applying a data demand signal to said electronic control system;

third means for receiving data from said electronic control system through said selected one communication system; and display means for displaying received data in a form of diagnosis data.

2. The system according to claim 1, wherein said diagnosis programs and said identification code are stored in said memory, said memory being provided in a cartridge detachably attached to said computer.

3. The system according to claim 1 wherein the diagnosis device has indicators which are connected to switches mounted on the motor vehicle through the connecting means so as to turn on corresponding indicators in accordance with operations of the switches.

4. The system according to claim 1 wherein the computer is arranged to be connected to an outside computer having a display so that the outside computer receives data from the electronic control system to display the data on the display.

5. A diagnosis system for diagnosing a control system mounted on a vehicle having a diagnosis device, a cartridge detachably connected to the diagnosis device, and connecting means for transmitting signals between the control system and the diagnosis device, said diagnosis device having a keyboard for inputting a keyboard signal, a display, a clock pulse generator, a power switch, and demanding means responsive to the keyboard signal for supplying a data demand signal to the control system, and said control system having means responsive to the data demand signal for producing a data signal representing a corresponding data, the diagnosis system comprising:

first communication system for supplying clock pulses from the clock pulse generator to the control system and for transmitting the data signal from the control system to the diagnosis device in synchronism with the clock pulses;

second communication system for transmitting the data signal from the control system to the diagnosis device by start-stop mode;

third communication system for transmitting the data signal from the control system to the diagnosis device in synchronism with clock pulses produced in the control system;

storing means provided in the cartridge for storing programs to diagnose the control system and an identification code representing a type of the control system;

reading means for reading the identification code without inputting the keyboard signal when the power switch is turned on and for producing an identification code signal;

select means responsive to the identification code signal for selecting one of the first, second, and third communication systems, corresponding to the type of the control system to be diagnosed; and means for receiving the data signal from the control system corresponding to the data demand signal, through the selected communication system and for displaying the received data on the display, so as to easily perform diagnosis without operating the keyboard to select the communication system specific to the control system.

6. The diagnosis system according to claim 5, wherein the diagnosis system has a plurality of switches provided in the control system for producing on/off signals and a plurality of indicators provided on the diagnosis device for receiving the corresponding on/off signals of the switches through the connecting means and for indicating operating conditions of the switches.

* * * * *